United States Patent Office 2,800,356
Patented July 23, 1957

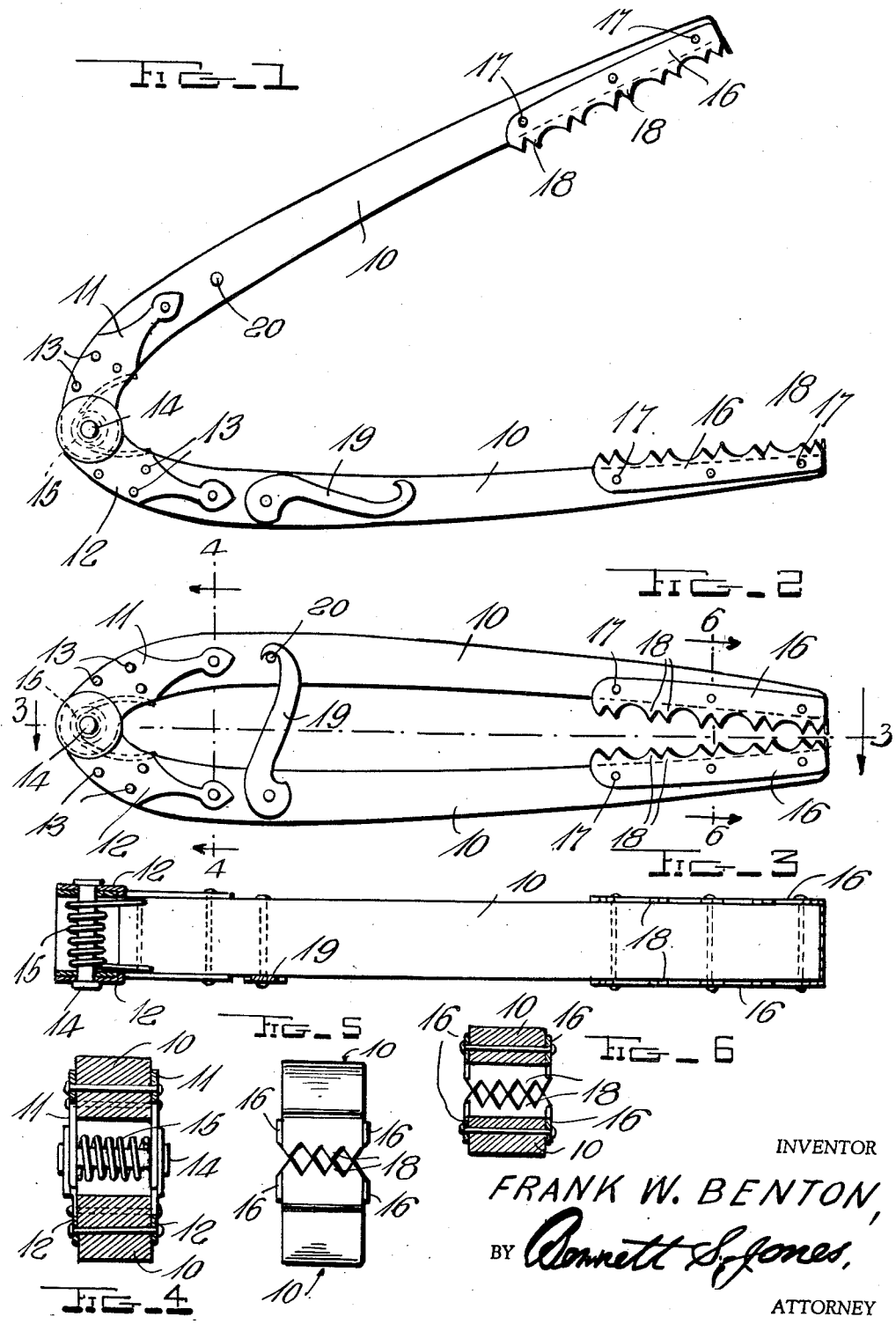

2,800,356
FISH HOLDING DEVICES
Frank W. Benton, Wilson, N. C.
Application October 5, 1953, Serial No. 384,053
1 Claim. (Cl. 294—106)

The object of the invention is to provide a further improvement on the construction disclosed in Patent No. 2,358,682, and also to provide a fish holding device in which the jaw arms are of solid but light construction and are operatively connected through the instrumentality of a hollow hinge which houses the spring normally impelling the jaw arms away from each other; and generally to simplify and cheapen the construction of the holder without reduction in its efficiency in operation or sturdiness of construction.

With this object in view, the invention consists in a construction and combination of parts of which preferred embodiment is illustrated in the accompanying drawings, wherein:

Figure 1 is a side elevational view of the invention with the jaw arms separated;

Figure 2 is a view similar to Figure 1 but showing the jaw arms in closed position;

Figure 3 is a sectional view on the plane indicated by the line 3—3 of Figure 2;

Figure 4 is a sectional view on the plane indicated by line 4—4 of Figure 2;

Figure 5 is an end elevational view of the structure of Figure 2 at the tooth end of the latter; and Figure 6 is a sectional view on the plane indicated by the line 6—6 of Figure 2.

As generally, the holder consists of spring axiated arms hinged at one end and carrying gripping jaws at the other ends. In the present form of the invention, the arms 10 are made of solid material as distinguished from chaneled or ribbed cross-sections and are joined, one to the hinge element 11 and the other to the hinge element 12 both of which are of bifurcated form to receive the arms between the bifurcations. Rivets 13 are employed to secure the hinge elements to the arms and the hinge elements are pivotally connected by means of a pivot pin 14, around which is coiled a torsion spring 15 of which the terminals bear one against one arm and the other against the other arm so that the latter are normally swung away from each other or into open position.

At their free ends, the arms carry the gripping members 16 which are in the form of metal strips embracing the arms around the extremities and on opposite sides are secured to the arms through the medium of rivets or fasteners 17. The gripping members are notched on their under-faces to provide teeth 18 which project beyond the inner faces of the arms and thus serve to hold fish when the arms are pressed together on the fish, as when the arms are gripped and brought together by the hand of the user.

When not in use, it is preferable to hold the device in closed position as indicated in Figure 2 and for this purpose a latch member 19 is pivotally mounted on the side of one arm 10 and engages a pin 20 on the side of the opposite arm.

While the hinge, as well as the griping members, in the present instance are shown applied laterally to the arms, it is obvious that the former may have its leaves applied on the top-faces of the arms and the gripping members applied on the under-faces of the arms without departing from the spirit of the improvements as herein disclosed.

The invention, having been described, what is claimed as new and useful is:

In a fish holder, a pair of arms of identical size and shape substantially rectangular in cross section, a hinge comprising a pair of bifurcated members interfitting with one another at one end, a hinge pin connecting said members, the opposite ends of said members embracing the flat sides of the inner ends of said arms and secured thereto, a torsion spring encircling said pins and having its ends engaged respectively with said arms, gripper members each comprising a one piece metal plate extending along and in contact with both flat sides and across the outer end of each of said arms, the edges of said plates being serrated to form teeth projecting inwardly beyond the inner surfaces of said arms, and rivets passing through said plates and said arms to secure the same together.

References Cited in the file of this patent
UNITED STATES PATENTS

| | | |
|---|---|---|
| 2,358,682 | Benton et al. | Sept. 19, 1944 |
| 2,517,168 | Bennek | Aug. 1, 1950 |